United States Patent Office 3,701,587
Patented Oct. 31, 1972

3,701,587
IMAGE FOCUSING LENS SYSTEM FOR
COPYING MACHINES
Tadashi Kojima, Tokyo, Japan, assignor to Konishiroku
Photo Industry Co., Ltd., Tokyo, Japan
Filed May 19, 1971, Ser. No. 144,718
Claims priority, application Japan, May 20, 1970,
45/42,436
Int. Cl. G02b 9/58
U.S. Cl. 350—202                                   4 Claims

ABSTRACT OF THE DISCLOSURE

A new system for copying machines, including an image focusing lens system is now proposed. The said image focusing lens system which is the subject matter of the present application has a bright F number as large as about 4 and is well compensated in aberration. The image focusing lens system incorporates a substantially symmetrical image focusing lens construction or a symmetrical half of the focusing lens construction with the addition of a plane mirror, roof mirror or roof prism (Dach prism) disposed behind the symmetrical lens half.

---

Figure 1:
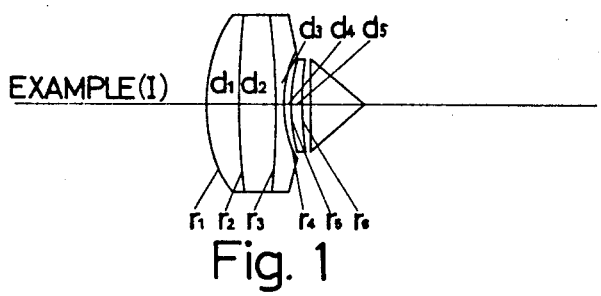

This invention relates to optical systems for copying machines comprising a substantially symmetrical image focusing lens construction or a symmetrical half of said symmetrical lens construction with the addition of a plane mirror, roof mirror or roof prism (Dach prism) disposed behind said symmetrical lens half.

The image focusing lens and the optical system for copying machines are well known in the art. However, at present an optical system for copying machines which has a bright F number (stop open rate) of about 4 and is excellently aberration compensated and provided with a prism as according to the present invention is seldom known.

An object of the invention is to provide an optical system for copying machines, which has a small F number and is excellently aberration compensated, and in which it is possible to use a symmetrical half of a substantially symmetrical lens construction as the image focusing lens and place therebehind a Dach prism or roof mirror for obtaining inverse image of and having nearly the same size as the original. Of course, without incorporation of the prism the image focusing lens system according to the invention provides high performance.

To achieve the above object, the image focusing lens for copying according to the invention either comprises four lens groups, the first one of said lens groups having a positive refractive power and consisting of a convex-concave lens, a double-convex lens and a double-concave lens cemented together in the mentioned order from the object side, the second one of said lens groups consisting of a convex-concave lens, the third one of said lens group consisting of a concave-convex lens defining a comparatively wide air gap with and in a substantially symmetrical relation to the second lens group, and the fourth or last one of said lens groups being in a substantially symmetrical relation to the first lens group and consisting of a double-concave lens, a double-convex lens and a concave-convex lens cemented together, or it comprises said first and second lens groups and either a Dach prism disposed behind the second lens groups with the base of the prism made perpendicular to the optical axis or a plane mirror disposed behind the second lens group.

Denoting the resultant focal distance of the entire lens system of the afore-mentioned four group construction by $f$, the radii of curvature of the involved refracting surfaces respectively by $r_1, r_2, \ldots r_{12}$ from the object side, the optical axis distance between adjacent refracting surfaces respectively by $d_1, d_2, \ldots d_{11}$ from the object side, the refractive indices and the Abbé numbers of the material of the individual lenses respectively by $n_1, n_2, \ldots n_8$ and $\nu_1, \nu_2, \ldots \nu_8$ from the object side, and the focal distances of the first to fourth lens groups respectively by $f_\mathrm{I}, f_\mathrm{II}, f_\mathrm{III},$ and $f_\mathrm{IV}$, the lens system according to the invention specifies the following requirements:

(I)   $\quad 0.1\,f < d_6 < 0.15\,f$ (II)  $\quad 0.008\,f < d_4$ and $d_8 < 0.016\,f$
$\quad\quad 0.012\,f < d_5$ and $d_7 < 0.020\,f$
$\quad\quad 0.9\,f < f_\mathrm{II}$ and $f_\mathrm{III} < 1.3\,f$
$\quad\quad 1.0\,f < -r_3$ and $r_{10} < 1.5\,f$
$\quad\quad 0.03 < n_2 - n_3$ and $n_7 - n_6 < 0.08$ (III) $\quad 1 < \nu_3 - \nu_2$ and $\nu_6 - \nu_7 < 10$
$\quad\quad 10 < \nu_1 - \nu_2$ and $\nu_8 - \nu_7 < 30$ and (IV)  $\quad 0.20\,f < r_1$ and $-r_{12} < 0.30\,f$
$\quad\quad 0.13\,f < r_4$ and $-r_9 < 0.23\,f$
$\quad\quad 0.32\,f < r_6$ and $-r_7 < 0.58\,f$ The requirement I is to be met in case the lens system having a substantially symmetrical construction is divided into two symmetrical lens groups and a Dach prism is inserted behind one group.

The requirement II is to be met in order to compensate for the degradation of the coma flare and the image distortion resulting from the imposition of the requirement I.

The requirement III is to be met in case the lens system according to the invention has the afore-mentioned first and fourth lens groups each consisting of the cemented three-piece lens in order to compensate for the degradation of the chromatic aberration when magnifying the original at high angles resulting from the imposition of the requirements I and II.

The requirement IV is to be met in order to compensate for the spherical aberration and the image distortion as a result of imposing the requirements I to III.

The reasons for specifying the above requirements will now be discussed in detail. The aberrations referred to hereinafter pertain to the employment of the lens system according to the invention for producing images of nearly the same size as the original.

Where the optical system for a copying machine is constructed by symmetrically dividing an image focusing lens system having a substantially symmetrical construction into two groups and placing a Dach prism or the like behind one of the groups, the two groups should define a considerably wide air gap between them for the interposition of the prism between them. The lower limit in the inequality $0.1\,f < d_6 < 0.15\,f$ of requirement I indicates the minimum air gap necessary for the insertion of the afore-mentioned prism. This inequality is also useful for reducing the excessive compensation type coma flare, which is greater for the image focusing lens of a smaller F number. On the other hand, if the upper limit of the inequality is exceeded, the insufficient compensation type coma flare is outstandingly increased for high angle projection, which is impossible to remove by other means. Even if $d_6$ is as large as is within the range of the above inequality, the insufficient compensation type coma flare is considerably great for higher projection angles, so that the insufficient compensation type image distortion is very noticeable.

The inequalities in the requirement II are necessary mainly for the compensation of the insufficient compensation type coma flare and the insufficient type image distortion. For the compensation of the insufficient compensation type coma flare and image distortion, it is effective to make the gap between the lenses of the first and second lens groups and between the lenses of the third and fourth lens groups and the thickness of the lenses of the second and third lens groups as small as possible. The inequalities $0.008 f < d_4$ and $d_8 < 0.016 f$ and $0.012 f < d_5$ and $d_7 < 0.020 f$ are given from this standpoint. The lower limit in these inequalities accounts for mechanical limitations imposed upon the lens manufacture. If the upper limit of these inequalities is exceeded, the correction of the insufficient compensation type coma flare and the insufficient type image distortion becomes impossible. As for the inequalities $0.9 f < f_{II}$ and $f_{III} < 1.3 f$, exceeding the upper limit leads to increasing the insufficient type coma flare and the insufficient type image distortion. On the other hand with $f_{II}$ and $f_{III}$ below the lower limit it is impossible to compensate third order aberrations, particularly the Petzsval sum and spherical aberrations. Further, to eliminate the insufficient compensation type coma flare it is desirable to have the third and tenth refracting surfaces concave with respect to the center of the lens system and have the refractive index lower for a component lens in the cemented lens structure closer to the center of the lens system. By so doing, however, the compensation becomes sharply excessive for meridional image areas corresponding to larger projection angles. Accordingly, it is specified that the third and tenth refracting surfaces are gently convex with respect to the center of the lens system within a range of $1.0 f < -r_3$ and $r_{10} < 1.5 f$ and that the refractive index for the component lens in the cemented lens structure closer to the center of the system is slightly lower compared to the adjacent component lens further from the center of the lens system within a range of $0.03 < n_2 - n_3$ and $n_7 n_6 < 0.08$. These specifications can afford to prevent the degradation of the meridional image distortion without having resort to increasing the insufficient compensation type coma flare. With $-r_3$ and $r_{10}$ above the upper limit of the specified inequality and with $n_2 - n_3$ and $n_7 - n_6$ below the lower limit of the specified inequality, excessive compensation of the distortion of the meridional image areas corresponding to higher projection angles results. On the other hand, with $-r_3$ and $r_{10}$ below the lower limit of the specified range and with $n_2 - n_3$ and $n_7 - n_6$ above the upper limit of the specified range, increase of the insufficient compensation type coma flare results.

The conditions in requirement III pertain to the compensation for the chromatic aberration of the lens system. To compensate for the paraxial and magnified chromatic aberrations well-known chromatic aberration compensating measures using a two-piece cemented lens consisting of a convex glass lens having a large Abbé number and a concave glass lens having a small Abbé number for each of the first and fourth lens groups are usually sufficient. However, where the requirement I is met to have a wide air gap between the second and third lens groups while meeting the requirement II, if the paraxial chromatic abberation compensating condition alone is satisfied, with increase in the projection angle the g-line meridional image tends to be subject to excessive compensation progressively greater than the d-line meridional image, eventually increasing the magnified chromatic aberration for higher projection angles. This tendency is particularly pronounced in the case of inserting a prism block in the air gap between the second and third lens groups. Thus, the use of the two-piece cemented lens for the first and fourth lens groups is insufficient to eliminate the magnified chromatic aberration up to higher projection angles while satisfying the requirements I and II. To sufficiently compensate for the magnified chromatic aberration it is necessary to use the three-piece cemented lens consisting of three component lenses respectively positive, positive and negative in the mentioned order with respect to the lens system center. It is possible to compensate for the magnified chromatic aberration for higher projection angles and for the excessive compensation of the g-line meridional image distortion by having the third and tenth refracting interfaces convex with respect to the lens system center as extremely weak coloring interfaces rather than decoloringones, that is, by selecting glass materials having Abbé numbers such that $1 < \nu_3 - \nu_2$ and $\nu_6 - \nu_7 < 10$ in defining the third and tenth interfaces under the conditions $1.0 f < -r_3$ and $r_{10} < 1.5 f$. With values of $\nu_3 - \nu_2$ and $\nu_6 - \nu_7$ below the lower limit, the g-line image distortion is excessively compensated while with values above the upper limit, its compensation is insufficient. To sufficiently compensate for the paraxial chromatic aberration, it is necessary to impart a subtsantially decoloring nature to the first and second lens groups. To this end, it is necessary to have the second and eleventh interfaces to be of a coloring nature and select glass materials having Abbé numbers such that $10 < \nu_1 - \nu_2$ and $\nu_8 - \nu_7 < 30$ in defining these interfaces. With Abbé numbers giving resultant values below the lower limit, the de-coloring is insufficient while with the resultant values above the upper limit, excessive de-coloring results.

In the requirement IV, the condition $0.20 f < r_1$ and $-r_{12} < 0.30 f$, and the condition $0.13 f < r_4$ and $-r_9 < 0.23 f$ are necessary for the spherical aberration compensation. Under the condition $0.9 f < f_{II}$ and $f_{III} < 1.3 f$, with $r_1$ and $-r_{12}$ above the upper limit and with $r_4$ and $-r_9$ below the lower limit excessive spherical aberration compensation results, while with $r_1$ and $r_{12}$ below the lower limit and with $r_4$ and $-r_9$ above the upper limit insufficient spherical aberration compensation results. On the other hand the condition $0.32 f < r_6$ and $-r_7 < 0.58 f$ is necessary for providing an appropriate compensation for the image distortion under the above various conditions. Greater values than the upper limit result in excessive compensation for the image distortion, while less values than the lower limit result in insufficient compensation.

From the foregoing description, it will be seen that according to the invention it is possible to provide a lens system for copying machines, which has a small F number and is excellently aberration compensated and provided with a prism for producing inverse images.

Three non-limitative examples are given in the following. Example I uses the first and second lens groups in Example II and a 45°–90°–45° roof prism disposed behind the second lens group such that $d_{p1} = 0.01583$ and $d_{p2} = 0.0969$ and having the d-line refractive index of $n_p = 1.75520$ and the Abbé number of $\nu_p = 27.5$, and in which the air gap $d_6$ is calculated by the equation $$d_6 = 2\left(d_{p1} + \frac{d_{p2}}{n_p}\right)$$

As mentioned before, $r_1, r_2 \ldots r_{12}$ represent the radii of curvature of the refracting faces individual $d_1, d_2, \ldots d_{11}$ represent the axial distances between adjacent refracting faces, $n_1, n_2, \ldots n_8$ represent the refractive indices of the individual lenses, $\nu_1, \nu_2, \ldots \nu_8$ represent the Abbé numbers of the individual lenses, and $f_{II}$ and $f_{III}$ represent the focal distances of the second and third lens groups.

Figure 2:
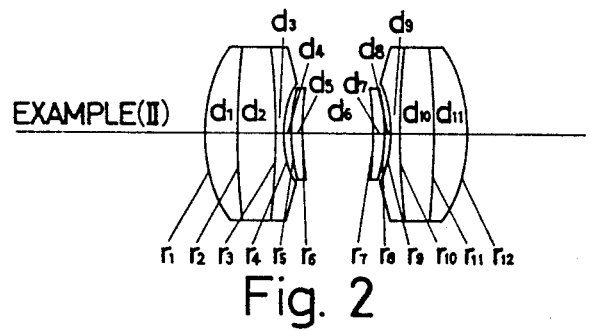
Figure 3:
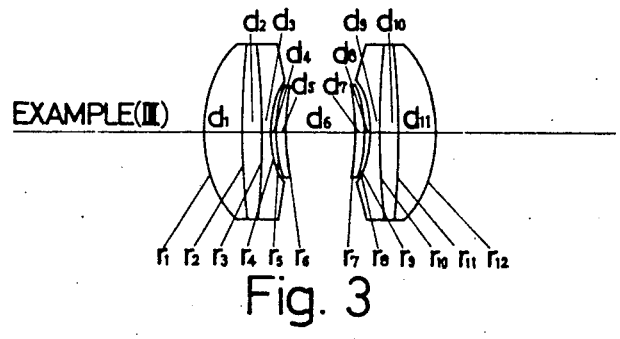
Figure 4:
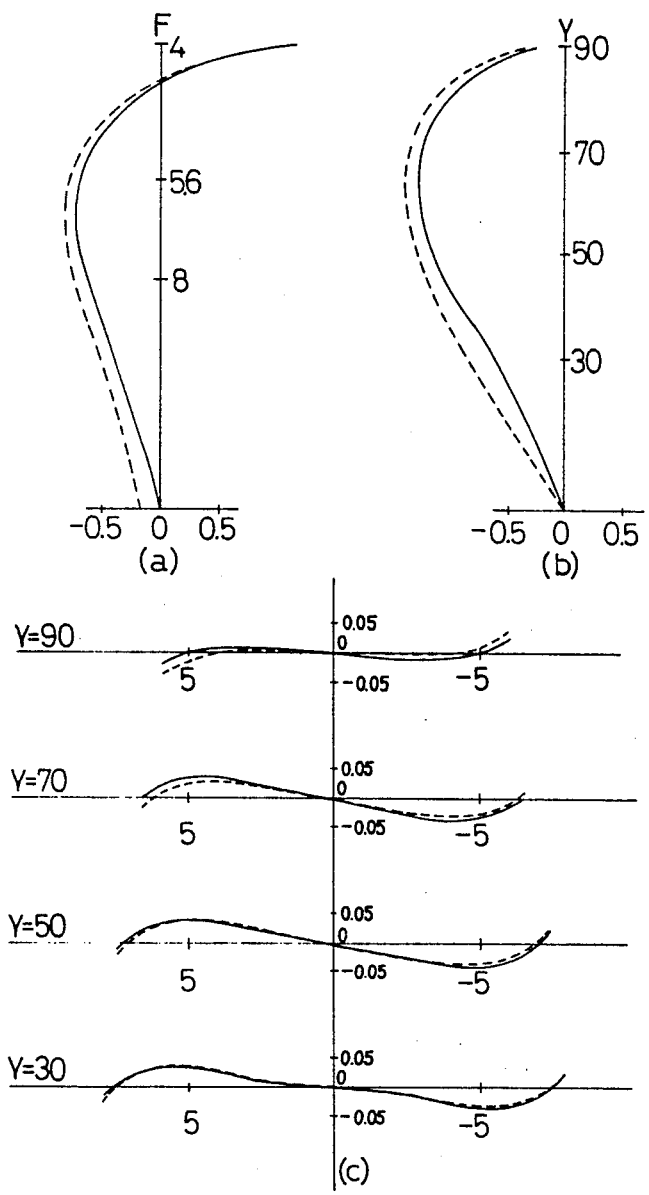
Figure 5:
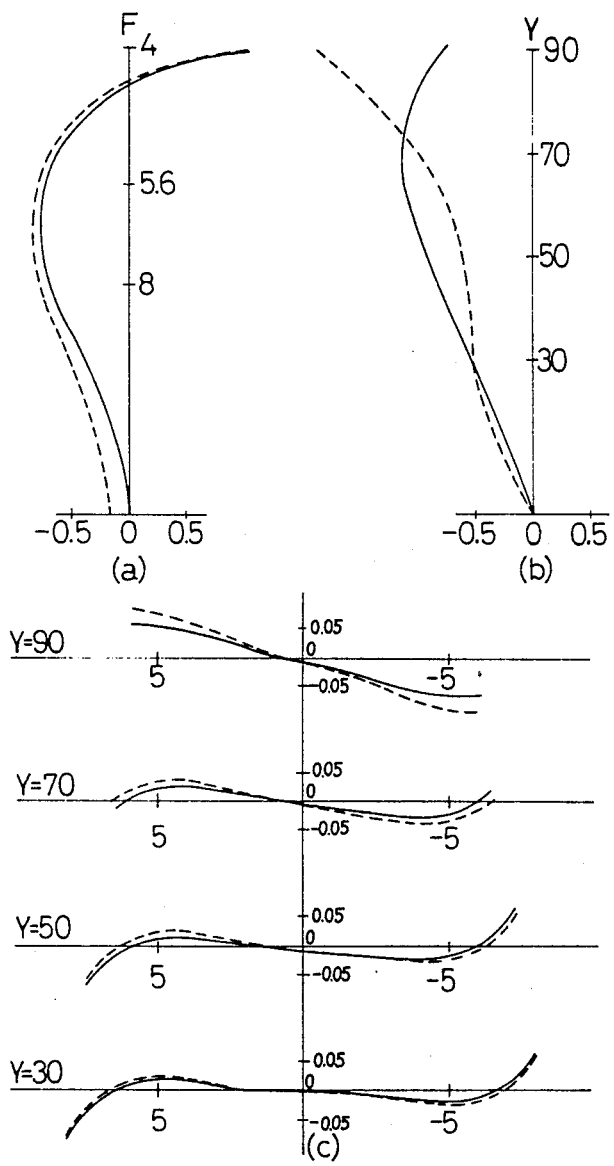
Figure 6:
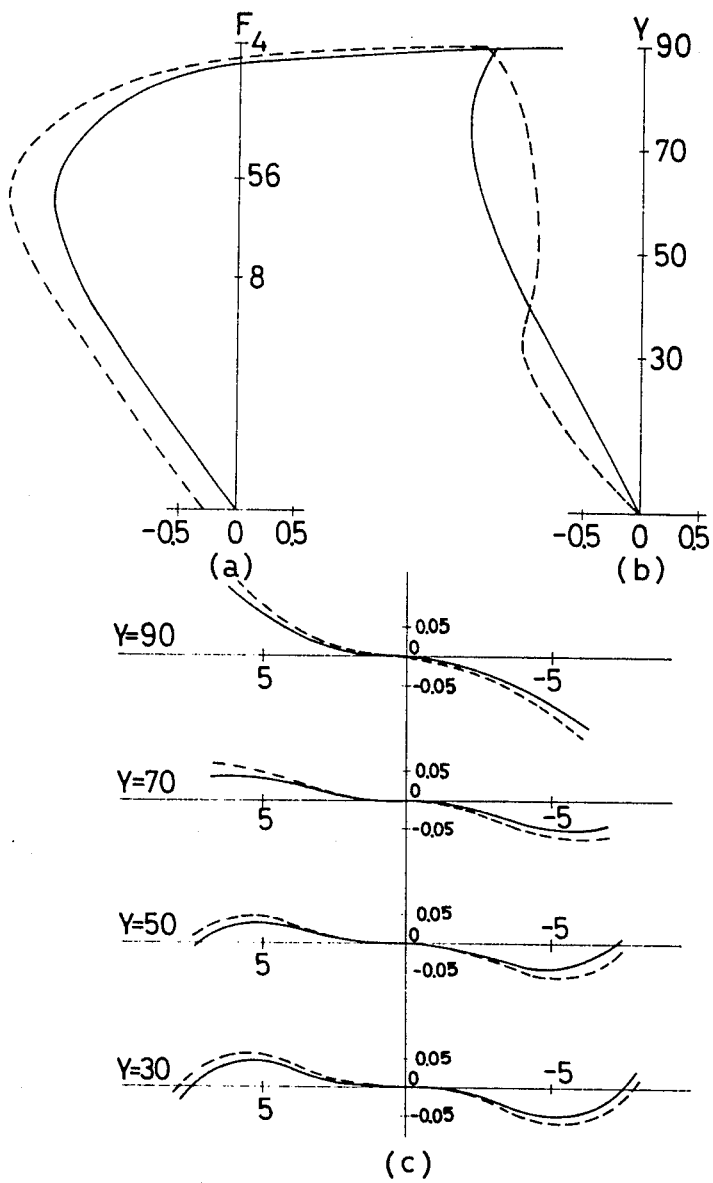

Now the present invention will be explained with reference to the attached drawings and examples. FIG. 1 is a sectional view of a first embodiment of the invention. FIGS. 2 and 3 are sectional views of the second and third embodiments of the invention. FIGS. 4 to 6 show aberration curves for the first, second and third embodiments, with the graphs a showing the spherical aberration, the graphs b showing the astigmatism aberration, and graphs c showing the meridonal coma aberration.

EXAMPLE I $f=1.0$  F 1:4.0

| | | | |
|---|---|---|---|
| $r_1=0.27202$ | | | |
| | $d_1=0.05913$ | $n_1=1.62041$ | $\nu_1=60.2$ |
| $r_2=2.41959$ | | | |
| | $d_2=0.06205$ | $n_2=1.62588$ | $\nu_2=35.7$ |
| $r_3=-1.17752$ | | | |
| | $d_3=0.01477$ | $n_3=1.57845$ | $\nu_3=41.5$ |
| $r_4=0.195116$ | | | |
| | $d_4=0.01119$ | | |
| $r_5=0.30461$ | | | |
| | $d_5=0.01629$ | $n_4=1.74100$ | $\nu_4=52.6$ |
| $r_6=0.48202$ | | | |
| | $d_{p1}=0.01583$ | | |
| $r_{p1}=\infty$ | | | |
| | $d_{p2}=0.09609$ | $n_p=1.75520$ | $\nu_p=27.5$ |
| $r_{p2}=\infty$ | | | |

(45°–90°–45° prism)

Calculated air gap $d_6=0.14114$.
$f_{II}=1.0749$.

EXAMPLE II $f=1.0$  F 1:4.0

| | | | |
|---|---|---|---|
| $r_1=0.27318$ | | | |
| | $d_1=0.05939$ | $n_1=1.62041$ | $\nu_1=60.2$ |
| $r_2=2.42997$ | | | |
| | $d_2=0.06231$ | $n_2=1.62588$ | $\nu_2=35.7$ |
| $r_3=-1.18256$ | | | |
| | $d_3=0.01483$ | $n_3=1.57845$ | $\nu_3=41.5$ |
| $r_4=0.19595$ | | | |
| | $d_4=0.01124$ | | |
| $r_5=0.30592$ | | | |
| | $d_5=0.01636$ | $n_4=1.74100$ | $\nu_4=52.6$ |
| $r_6=0.48408$ | | | |
| | $d_6=0.13222$ | | |
| $r_7=-0.48408$ | | | |
| | $d_7=0.01636$ | $n_5=1.74100$ | $\nu_5=52.6$ |
| $r_8=-0.30592$ | | | |
| | $d_8=0.01124$ | | |
| $r_9=-0.19595$ | | | |
| | $d_9=0.01483$ | $n_6=1.57845$ | $\nu_6=41.5$ |
| $r_{10}=1.18256$ | | | |
| | $d_{10}=0.06231$ | $n_7=1.62588$ | $\nu_7=35.7$ |
| $r_{11}=-2.42997$ | | | |
| | $d_{11}=0.05939$ | $n_8=1.62041$ | $\nu_8=60.2$ |
| $r_{12}=-0.27318$ | | | |

$f_{II}=f_{III}=1.0795$.

EXAMPLE III $f=1.0$  F 1:4.0

| | | | |
|---|---|---|---|
| $r_1=0.23987$ | | | |
| | $d_1=0.06282$ | $n_1=1.60311$ | $\nu_1=60.5$ |
| $r_2=1.72775$ | | | |
| | $d_2=0.03141$ | $n_2=1.60562$ | $\nu_2=43.7$ |
| $r_3=1.41361$ | | | |
| | $d_3=0.01728$ | $n_3=1.54814$ | $\nu_3=45.7$ |
| $r_4=0.17192$ | | | |
| | $d_4=0.01178$ | | |
| $r_5=0.25084$ | | | |
| | $d_5=0.01571$ | $n_4=1.56873$ | $\nu_4=63.1$ |
| $r_6=0.40209$ | | | |
| | $d_6=0.12375$ | | |
| $r_7=-0.40209$ | | | |
| | $d_7=0.01571$ | $n_5=1.56873$ | $\nu_5=63.1$ |
| $r_8=0.25084$ | | | |
| | $d_8=0.01178$ | | |
| $r_9=-0.17192$ | | | |
| | $d_9=0.01728$ | $n_6=1.54814$ | $\nu_6=45.7$ |
| $r_{10}=1.41361$ | | | |
| | $d_{10}=0.03141$ | $n_7=1.60562$ | $\nu_7=43.7$ |
| $r_{11}=-1.72775$ | | | |
| | $d_{11}=0.06282$ | $n_8=1.60311$ | $\nu_8=60.5$ |
| $r_{12}=-0.23987$ | | | |

$f_{II}=f_{III}=1.12998$.

The following tables list the aberration coefficients for all the refracting faces and for the entire system of the Examples I and II, with $f=1.0$, magnification being $-1$, and the first refracting face paraxial incidence height being 1. The iris is assumed to be set at the center of the lens system. The character $S_I$ represents the coefficient of spherical aberration, $S_{II}$ the coefficient of coma aberration, $S_{III}$ the coefficient of astigmatism, P the Petzval sum, and $S_V$ the coefficient of distortional aberration.

EXAMPLE II

| | $S_I$ | $S_{II}$ | $S_{III}$ | P | $S_V$ |
|---|---|---|---|---|---|
| 1 | 21.8138 | 0.4142 | 0.0079 | 1.4015 | 0.0267 |
| 2 | -0.0038 | 0.0045 | -0.0053 | 0.0008 | 0.0052 |
| 3 | 0.3918 | -0.2062 | 0.1086 | 0.0156 | -0.0654 |
| 4 | -33.8874 | -3.6457 | -0.3922 | -1.8702 | -0.2434 |
| 5 | 13.8164 | 2.9833 | 0.6442 | 1.3913 | 0.4395 |
| 6 | -1.1395 | -0.6549 | -0.3765 | -0.8792 | -0.7218 |
| 7 | -1.1395 | 0.6549 | -0.3765 | -0.8792 | 0.7218 |
| 8 | 13.8164 | -2.9833 | 0.6442 | 1.3913 | -0.4395 |
| 9 | -33.8874 | 3.6457 | -0.3922 | -1.8702 | 0.2434 |
| 10 | 0.3918 | 0.2062 | 0.1086 | 0.0156 | 0.0654 |
| 11 | -0.0038 | -0.0045 | -0.0053 | 0.0008 | -0.0052 |
| 12 | 21.8138 | -0.4142 | 0.0079 | 1.4015 | -0.0267 |
| Σ | 1.9827 | 0 | -0.0268 | 0.1197 | 0 |

EXAMPLE III

| | $S_I$ | $S_{II}$ | $S_{III}$ | P | $S_V$ |
|---|---|---|---|---|---|
| 1 | 29.5549 | 0.5237 | 0.0093 | 1.5684 | 0.0280 |
| 2 | -0.0021 | 0.0023 | -0.0027 | 0.0006 | 0.0024 |
| 3 | 0.5613 | -0.2857 | 0.1454 | 0.0164 | -0.0823 |
| 4 | -45.8959 | -4.0267 | -0.3533 | -2.0596 | -0.2117 |
| 5 | 19.6447 | 3.4107 | 0.5922 | 1.4453 | 0.3537 |
| 6 | -1.9425 | -0.8940 | -0.4114 | -0.9016 | -0.6043 |
| 7 | -1.9425 | 0.8940 | -0.4114 | -0.9016 | 0.6043 |
| 8 | 19.6447 | -3.4107 | 0.5922 | 1.4453 | -0.3537 |
| 9 | -45.8959 | 4.0267 | -0.3533 | -2.0596 | 0.2117 |
| 10 | 0.5613 | 0.2857 | 0.1454 | 0.0164 | 0.0823 |
| 11 | -0.0021 | -0.0023 | -0.0027 | 0.0006 | -0.0024 |
| 12 | 29.5549 | -0.5237 | 0.0093 | 1.5684 | -0.0280 |
| Σ | 3.8407 | 0 | 0.0412 | 0.1389 | 0 |

FIGS. 4 to 6 show aberration curves for the Examples I, II and III plotted for $f=100$. In these figures, the graphs $a$ show the $d$-line spherical aberration by the solid curve and the $g$-line spherical aberration by the dashed curve, the graphs $b$ show the image distortion by the solid line and the meridional image distortion by the dashed curve, and graphs $c$ show the $d$-line coma aberration by the solid line and the $g$-line coma distortion by the dashed curve. It will be seen that the spherical aberration, image distortion, magnified chromatic aberration and coma aberration are all satisfactorily compensated for with the F number (stop open rate) of 4. The abscissa in the graphs $c$ in FIGS. 4 to 6 for some angles of light incidence on the iris plane. The distortional aberration is not shown, since it is zero for the magnification of $-1$ in all the examples.

What I claim is:

1. An image focusing lens system for copying machines comprising four lens groups, the first one of said lens groups having a positive refractive power and consisting of a cemented lens having three sub-lenses respectively positive, positive and negative in the mentioned order with respect to the object, the second one of said lens groups consisting of a convexo-concave lens with respect to the object, the third one of said lens groups consisting of a concave-convex lens with respect to the object and defining a comparatively wide air gap with and in a substantially symmetrical relation to said second lens group, and the fourth one of said lens groups being in a substantially symmetrical relation to said first lens group and consisting of a cemented lens having three sub-lenses respectively negative, positive and positive in the mentioned order with respect to the object, said lens system satisfying the inequalities:

(I)         $0.1f<d_6<0.15f$ (II)        $0.008f<d_4$ and $d_8<0.016f$
           $0.012f<d_5$ and $d_7<0.020f$
           $0.9f<f_{II}$ and $f_{III}<1.3f$
           $1.0f<-r_3$ and $r_{10}<1.5f$
           $0.03<n_2-n_3$ and $n_7-n_6<0.08$ (III)       $10<\nu_3-\nu_2$ and $\nu_6-\nu_7<10$
           $10<\nu_1-\nu_2$ and $\nu_8-\nu_7<30$ (IV)       $0.20f<r_1$ and $-r_{12}<0.30f$
           $0.13f<r_4$ and $-r_9<0.23f$
           $0.32f<r_6$ and $-r_7<0.58f$ where $f$ represents the resultant focal distance of the entire lens system consisting of said four lens groups, $r_1, r_2, \ldots r_{12}$ represent the radii of curvature of the refracting faces, $d_1, d_2, \ldots d_{11}$ represent the axial distance between adjacent refracting faces, $n_1, n_2, \ldots n_8$ represent the $d$-line refractive indices of the individual single lenses and sub-lenses, $\nu_1, \nu_2, \ldots \nu_8$ represent the Abbé numbers of the individual single lenses and sub-lenses, and $f_I, f_{II}, f_{III}$ and $f_{IV}$ represent the focal lengths of said first to fourth lens groups, the subscripts in the characters indicating the order of separation from the object.

2. An image focusing system for copying machines comprising two lens groups, the first one of said lens groups having positive refractive power and consisting of a cemented lens having three sub-lenses respectively positive, positive, and negative in the mentioned order with respect to the object, the second one of said lens groups consisting of a convexo-concave lens with respect to the object, and image reflecting means disposed behind said second lens group to redirect light rays back through the first and second lens groups, said lens system satisfying the inequalities:

(I)           $0.1f < d_6 < 0.15f$
(II)          $0.008f < d_4 < 0.01f$
            $0.012f < d_5 < 0.020f$
            $0.9f < f_{II} < 1.3f$
            $1.0f < -r_3 < 1.5f$
            $0.03 < n_2 - n_3 < 0.08$
(III)         $1 < \nu_3 - \nu_2 < 10$
            $10 < \nu_1 - \nu_2 < 30$
(IV)        $0.20f < r_1 < 0.30f$
            $0.12f < r_4 < 0.23f$
            $0.32f < r_6 < 0.58f$ where $f$ represents the resultant focal distance of the entire lens system, $r_1, r_2, \ldots, r_6$ represent the radii of curvature of the refracting faces, $d_1, d_2, \ldots, d_6$ represent the axial distances between adjacent refracting faces, $n_1, n_2, \ldots, n_4$ represent the $d$-line refractive indices of the individual single lenses and sub-lenses, $\nu_1, \nu_2, \ldots, \nu_4$ represent the Abbé numbers of the individual single lenses and sub-lenses, and $f_{II}$ represents the focal length of said second lens group, the subscripts in the characters indicating the order of separation from the object.

3. A system as claimed in claim 2, said image reflecting means comprising a roof prism disposed behind said second lens group with the base of said prism being perpendicular to the optical axis.

4. A system as claimed in claim 2, said image reflecting means comprising a plane mirror disposed behind said second lens group.

References Cited

UNITED STATES PATENTS 3,370,905    2/1968    Hudson           350—215 X

FOREIGN PATENTS 1,008,952    11/1965    Great Britain      350—202
343,850    11/1920    Germany          350—202

JOHN K. CORBIN, Primary Examiner

U.S. Cl. X.R.

350—220